US008480470B2

(12) United States Patent
Napolitano et al.

(10) Patent No.: US 8,480,470 B2
(45) Date of Patent: Jul. 9, 2013

(54) SYSTEM AND METHOD FOR FACILITATING THE OPERATION OF A COMBINED LOTTERY/RAFFLE GAME

(75) Inventors: Thomas J. Napolitano, East Greenwich, RI (US); Stephen Lazar, Tampa, FL (US)

(73) Assignee: GTECH Corporation, Providence, RI (US)

( * ) Notice: Subject to any disclaimer, the term of this patent is extended or adjusted under 35 U.S.C. 154(b) by 1289 days.

(21) Appl. No.: 12/259,688

(22) Filed: Oct. 28, 2008

(65) Prior Publication Data

US 2009/0186680 A1 Jul. 23, 2009

Related U.S. Application Data

(60) Provisional application No. 61/011,588, filed on Jan. 18, 2008.

(51) Int. Cl.
*A63F 13/00* (2006.01)

(52) U.S. Cl.
USPC .............................................. 463/17; 463/16

(58) Field of Classification Search
USPC ...................................................... 463/24–28
See application file for complete search history.

(56) References Cited

U.S. PATENT DOCUMENTS

| | | | | |
|---|---|---|---|---|
| 5,628,684 | A | 5/1997 | Bouedec | |
| 6,210,275 | B1 * | 4/2001 | Olsen | 463/16 |
| 6,210,276 | B1 | 4/2001 | Mullins | |
| 6,923,440 | B2 | 8/2005 | Cherry | |
| 7,018,292 | B2 | 3/2006 | Tracy et al. | |
| 7,419,426 | B2 | 9/2008 | Daskalakis | |
| 7,780,522 | B2 * | 8/2010 | Lutnick et al. | 463/25 |
| 2005/0194741 | A1 | 9/2005 | Kowell | |
| 2006/0012116 | A1 | 1/2006 | Lovell | |
| 2006/0160602 | A1 | 7/2006 | Blythe et al. | |
| 2006/0178194 | A1 | 8/2006 | Jubinville et al. | |
| 2006/0205476 | A1 | 9/2006 | Jubinville | |
| 2006/0258433 | A1 | 11/2006 | Finocchio et al. | |
| 2006/0261545 | A1 | 11/2006 | Rogers | |
| 2007/0026927 | A1 | 2/2007 | Yaldoo et al. | |
| 2007/0167208 | A1 | 7/2007 | Acres | |
| 2007/0191084 | A1 | 8/2007 | Tarantino | |
| 2007/0218980 | A1 | 9/2007 | Pachnis et al. | |
| 2007/0218985 | A1 | 9/2007 | Okada | |

(Continued)

OTHER PUBLICATIONS

International Search Report and Written Opinion for International Patent Application No. PCT/US09/31449 dated Mar. 11, 2009.

*Primary Examiner* — Paul A. D'Agostino
*Assistant Examiner* — Ankit Doshi
(74) *Attorney, Agent, or Firm* — William Mullen, PC; Thomas F. Bergert

(57) ABSTRACT

Systems and methods for administering an instant win lottery game where one prize may be entry into a future draw raffle game are disclosed. The holder of an instant win ticket with a future draw raffle indicator may redeem the ticket and receive a future draw raffle entry that is eligible for a prize awarded in a raffle drawing. In one alternative, a redeemed ticket with a symbol indicating the instant ticket is eligible for an entry in a bonus raffle game may be entered into a bonus raffle game.

38 Claims, 12 Drawing Sheets

U.S. PATENT DOCUMENTS

2007/0249418 A1 10/2007 Jubinville et al.
2007/0287533 A1 12/2007 Amour
2007/0293294 A1 12/2007 Lind et al.
2008/0009336 A1 1/2008 Walker et al.
2008/0015007 A1 1/2008 O'Brien
2008/0026810 A1 * 1/2008 Walker et al. .................. 463/17
2008/0064471 A1 3/2008 Bozeman
2009/0036192 A1 2/2009 Hughes

* cited by examiner

FIG. 4

640

| Prize | Quantity | Prize Value |
|---|---|---|
| $2<br>$2 OR MORE! | 97,500<br>2,500 | $195,000<br>$5,000 |
| $5<br>$5 OR MORE! | 39,000<br>1,000 | $195,000<br>$5,000 |
| $20<br>$20 OR MORE! | 9,750<br>250 | $195,000<br>$5,000 |
| $100<br>$100 OR MORE! | 1,950<br>50 | $195,000<br>$5,000 |
| $1,000<br>$1,000 OR MORE! | 195<br>5 | $195,000<br>$5,000 |
| $100,000 (instant winner) | 2 | $200,000 |
| $100,000 (raffle winner) | 1 | $100,000 |
| Totals: | 152,203 | $1,300,000 |

SYSTEM AND METHOD FOR FACILITATING THE OPERATION OF A COMBINED LOTTERY/RAFFLE GAME

RELATED APPLICATION AND PRIORITY CLAIM

This application claims priority under 35 U.S.C. 119 to U.S. provisional patent application 61/011,588 filed Jan. 18, 2008. The entire contents of the referenced provisional patent application are incorporated herein by the reference thereto.

BACKGROUND

Lottery games of both the "instant win" and "future draw" type games are popular. They are found in state run and privately run lottery systems worldwide, and provide a significant source of income for government operators to generate revenues for public purposes such as education.

Future draw lotteries, like Lotto or Powerball often have large prizes and appeal to players who purchase tickets on a regular schedule or with a group. However, these games, which often have daily or weekly draws, often do not appeal as much to players who want immediate entertainment and the chance for a win at the present time. However, future draw games with particularly large "life changing" jackpots often attract players who would not otherwise play the game, increasing returns for the game operators.

Instant win tickets are most commonly sold as "scratch-off" tickets, where the game result is indicated by game play information concealed by a removable scratch-off layer. This layer can be removed by the player after the ticket is purchased to reveal the game outcome. Instant win tickets are popular in part because they allow a player to determine the prize value of their ticket immediately after purchase. Instant win tickets also have bright, attractive graphic schemes and are sold as eye-catching consumer items. One approach to increasing instant win ticket sales that has been used successfully is to offer games that include a small likelihood of a large "life-changing" prize. These prizes may attract players who might not otherwise play the game, or cause regular players to purchase additional tickets.

However, generally there are only a limited number of large prizes in a particular instant ticket game with a finite number of issued tickets. Sometimes there may be only a single very large grand prize for a game. In some jurisdictions where large prize tickets are sold, the lottery may be required to pull or discontinue the game when the large prize is redeemed. The probability of having a particular level of ticket sales that occur before a redemption of a large prize can be statistically predicted. Game operators can then adjust the prize structure and payout percentage to insure the proper expected return for the lottery in light of the possibility of an early game termination. However, there is still a great deal of unnecessary expense incurred when an early redemption of the large prize ticket occurs.

To provide additional user interest, some game operators have provided drawings or additional play options for losing instant tickets, e.g., all players holding losing tickets could use a form to mail in losing tickets to be entered in a consolation drawing. One purpose of such drawings is to allow game operators to build up customer information databases for purchasers who would otherwise remain anonymous. However, such "second chance" games cannot provide any additional reward to holders of winning tickets because almost all instant lottery games require that winning tickets be tendered for redemption in order to receive the associated instant ticket prize. Thus holders of winning tickets, even for small prizes, could not be entered in a second chance mail in drawing.

BRIEF DESCRIPTION OF THE DRAWINGS

FIG. 4 is a prize structure, according to one example embodiment.

DETAILED DESCRIPTION OF EXAMPLE EMBODIMENTS

Figure 1A:
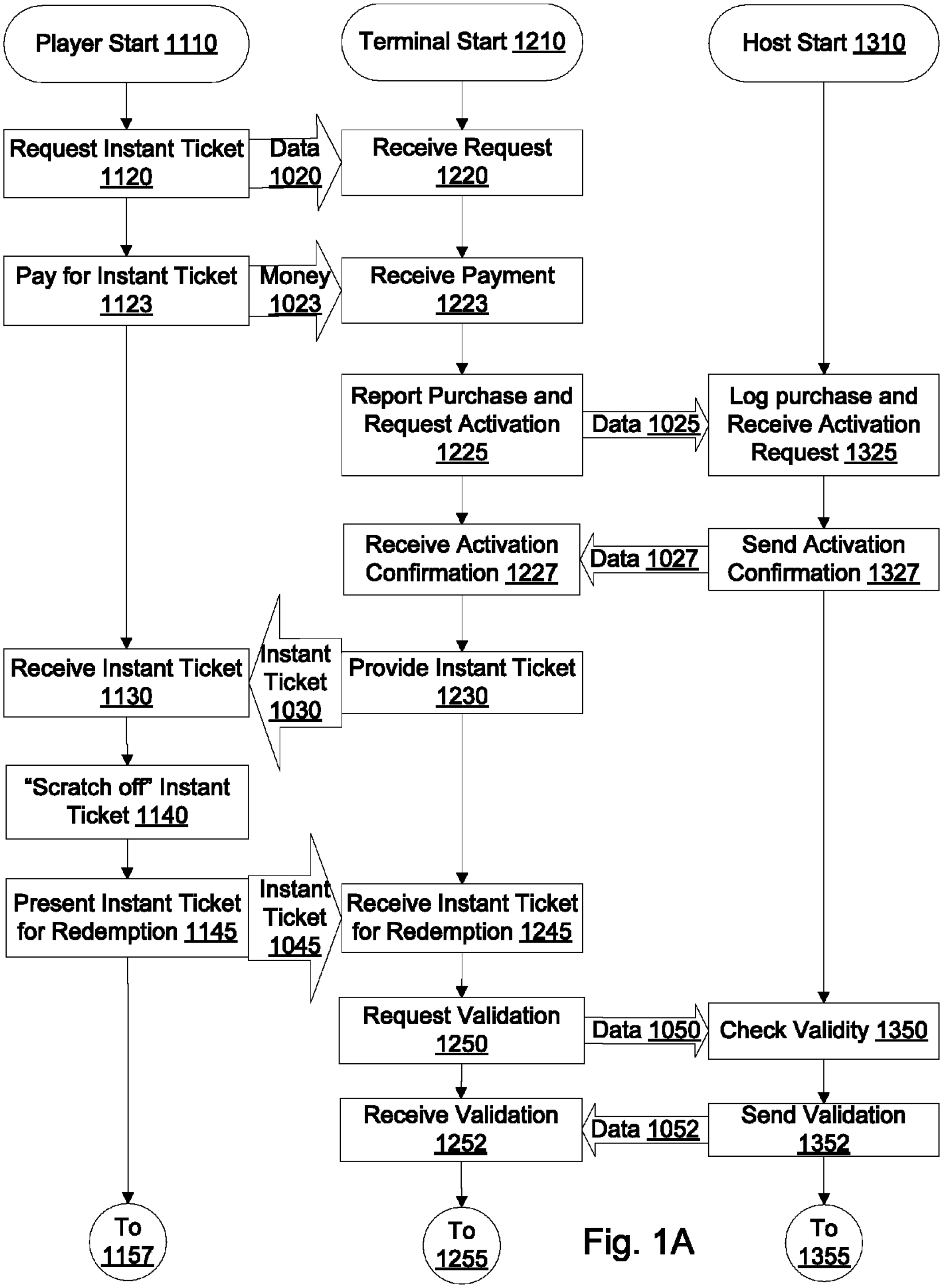
FIGS. 1A and 1B depict a flow chart of an example procedure which illustrates one example embodiment.

Some example embodiments include systems, methods and tickets for use in operating combined instant ticket/raffle games. These instant ticket games may provide conventional instant win cash prizes. In addition, some of the tickets in the game may also award a free entry into a raffle game that is to be held at a later time. The tickets awarding the free raffle entries may include a special symbol or combination of symbols indicating that the ticket holder has won a raffle chance. These raffle chance winning tickets may be presented for redemption, and a raffle ticket issued for a future raffle drawing.

The raffle drawing may occur at a time and date predetermined before the instant game goes on sale. Alternatively, a drawing may occur periodically, e.g., a drawing each week for all the instant tickets that were redeemed for raffle ticket awards in that week. In another alternative, the raffle may be delayed until all or a particular percentage of the instant game tickets for a particular game are sold. It will also be appreciated that a single raffle may include entries from multiple different instant games, rather than a single instant game, and that multiple prizes may be awarded in any single raffle.

By replacing a single or small number of large prize awards in the instant game, with a larger number of raffle chances, the game operator can still achieve the marketing value of having a large guaranteed jackpot, without the problems of early redemption of the winning large prize ticket causing the termination of the game. For example, a million dollar prize can be replaced by 10,000 separate awards, each providing an entry in a raffle for a million dollar prize. Players who win the raffle tickets may have a more interesting "extended play"

game experience, and more players may feel they came closer to winning a big prize, resulting in greater player interest.

One example embodiment is a method for the play of an instant win lottery game where one or more customers are provided instant win lottery tickets. The tickets include game play information. A first set of the tickets will have game play information which indicates the ticket is a winner of a cash (or cash equivalent) prize. A second set of the tickets will have a bonus indicator, indicating the holder of the ticket is eligible for entry in a bonus raffle game. A third set of the tickets will indicate both types of prizes, instant cash and bonus raffle entry. When a ticket, indicating eligibility for a bonus raffle entry, is redeemed, the holder of the ticket will be given a free raffle ticket which was generated for that ticket holder. A fourth set of tickets will not indicate eligibility for either prize.

When a player (e.g., customer) presents a ticket of the first or third set of tickets, the player may be given the appropriate cash prize.

When a player (e.g., a customer who has purchased a ticket) presents a ticket of the second or third set of tickets, the player may be given a free raffle ticket which was generated for the player and is an entry in a future draw raffle game.

The selling and redeeming of tickets may repeat for a given time period, for a given number of ticket sales, for a given number of ticket redemptions, for a given number of ticket redemptions of a particular set of tickets, or for any combination of those things. The raffle may wait for redeeming of all eligible game tickets or the closing of the game, or may occur after only a portion of the tickets or game duration has occurred. A raffle may be conducted which includes selecting one or more winning raffle tickets for one or more raffle prizes of equal or varying value. The holder of a winning raffle ticket may then redeem that ticket for the appropriate prize. Alternatively, a record of entrants may be kept and the entrants may not need to redeem an actual ticket to claim the appropriate prize.

Relevant information, such at entrant data, sales data, ticket information, ticket redemption information, winner data, and assorted other relevant data may be logged and used by example embodiments.

Optionally, an example embodiment may be a system or method which maintains raffle entrant records and randomly selects one or more records as the winners of the raffle.

Optionally, tickets may include unique human readable identification information on each of the raffle tickets. Optionally, the method may store an association between an entrant record and the human readable identification information corresponding to the raffle ticket.

Optionally, it may be the case that only raffle eligible instant win tickets which are redeemed for a free raffle ticket prior to the raffle drawing will be part of the drawing.

Optionally, raffle eligible instant win tickets may be redeemed at any point and given a free raffle ticket for the next available raffle drawing.

Optionally, the issuing of a free future draw raffle ticket may include generating a raffle ticket for a player, such that it may be the case that no raffle tickets exist or are pre-printed at the start of the instant lottery game.

Some other example embodiments may include a system for facilitating the operation of a game of chance that includes a plurality of pre-printed instant win lottery tickets with removable covers. Each of the lottery tickets will have game play information under the removable cover. A first set of tickets, where a set is a subset of the plurality, will have game play information which indicates the ticket is a winner of a cash (or cash equivalent) prize. A second set of tickets will have a bonus raffle eligibility indicator indicating the holder of the instant ticket is eligible for a free raffle ticket in a bonus future draw raffle game. Optionally, instead of a separate bonus raffle eligibility indicator, the game play information may indicate eligibility for a free raffle ticket.

There may be a plurality of terminals which are configured to receive the instant lottery tickets in the first set of tickets for redemption. Optionally, the terminals may be self-serve automated terminals or may be staffed by an agent. The terminals may redeem the first set of lottery tickets for cash prizes. The terminals may also redeem the second set of lottery tickets for a free raffle ticket for a future draw raffle.

There may also be a third set of tickets which have the prizes of both the first and second set. There may also be a fourth set of tickets which have the prizes of neither the first nor second set. The example embodiment may also have a host which is in network communication with the terminals. The host may be responsible to provide redemption information, prize information, and raffle ticket information to the terminals. The host may be responsible for generating the raffle tickets, which are issued at the terminals, to the appropriate players. The host may also be responsible for conducting the raffle by randomly selecting one or more winning raffle tickets.

The host may log and store relevant data such as entrant data, sales data, ticket information, information for the generated raffle tickets, ticket redemption information, winner data, and assorted other relevant data may be logged and used by example embodiments. The host may generate a record for each raffle ticket generated, and store that record in a database. The host may use these records to determine the winner by randomly selecting one or more winning records.

Optionally, the terminals, host, and tickets are designed with verification, validation, and/or anti-cheating mechanisms to ensure game integrity. The host is optionally configured to validate a raffle win and inform the terminal a raffle prize should be issued to the appropriate ticket holder.

Optionally, the method or system described above may allow a player to purchase a raffle ticket for a future draw raffle in addition to those raffle tickets being awarded.

Example embodiments include a plurality of tickets with game play information on a first layer of the ticket. The tickets have a second opaque layer which may be removable by a player (e.g., purchaser of the ticket) to reveal an indication of some prize. Game play information may indicate an “instant prize” of known value, such as for example, cash, credits, a free ticket, etc. Alternatively, game play information may indicate eligibility for a free future draw raffle ticket, which would have unknown value until the future draw determined if the raffle ticket was a winner. The example embodiment ticket may have a special raffle eligibility indicator separate from the above-mentioned game play information.

Optionally, the example embodiment may have a computer readable code (e.g., barcode) and/or human readable code. This code may be used to validate the ticket, or for a machine to read the contents of the ticket. The example embodiment may also include security and/or anti-tampering technologies.

Example embodiments may include a method for facilitating play of a game of chance, which includes providing a plurality of instant win lottery tickets for at least one instant ticket game, where all of the instant win lottery tickets include game play information for at least one instant ticket game. There may be at least a first subset of the instant lottery tickets having game play information that indicates the ticket is a winner of a prize in the respective instant lottery game, and at least a second subset of the instant lottery tickets having at least one symbol indicating the instant ticket is eligible for an entry in a bonus raffle game. Optionally, the eligibility indicator may be contained in the game play information. The method may, responsive to receiving an instant win lottery ticket from the first subset that has been tendered for a prize, redeem the lottery ticket for the prize indicated by the game play information on the lottery ticket. The method may repeat the redeeming for other ticket holders with lottery tickets in the first subset. The method may, responsive to receiving a lottery ticket from the second subset that has been tendered for the entry in the bonus raffle game, provide the ticket holder presenting the lottery ticket for redemption with a free raffle ticket. Optionally, providing may include generating the raffle ticket for the player. The method may repeat the providing for other ticket holders with lottery tickets in the second subset, yielding a plurality of ticket holders holding a plurality of free raffle tickets. Then, after the plurality of free raffle tickets has been provided, the method may randomly select at least one of a plurality of the free raffle tickets as a winner in a raffle. The method, responsive to receiving the winning ticket of the raffle for redemption, may provide a ticket holder with a raffle prize.

Optionally, some of the tickets may be of both the first and second subsets. Optionally, the method may generate a record for each free raffle ticket provided. Optionally, the method may store the records in a database or file. Optionally, the randomly selecting may include randomly selecting one of the records, and announcing that the ticket corresponding to the selected record is a winner in the raffle.

Optionally, the method may include unique human readable identification information on each of the provided raffle tickets, and store in association with each of the records, store the human readable identification information on the corresponding free raffle ticket.

Optionally, raffle tickets are only provided for those eligible instant lottery tickets that are presented for redemption prior to the raffle drawing, and the winner of the raffle is selected from the raffle tickets that are actually provided to ticket holders.

Example embodiments may include a system for facilitating the operation of a game of chance, including a plurality of pre-printed instant win lottery tickets with removable covers, where each of the lottery tickets have game play information under the removable covers. The tickets include a first subset of the instant lottery tickets having game play information that indicates to the holder of the ticket the ticket is a winner of a cash prize in the instant lottery game, and at least a second subset of the instant lottery tickets having at least one symbol indicating the holder of the instant ticket is eligible for an entry in a bonus raffle game. Optionally, the indicator may be in the game play information. Optionally, there may be a fourth set of tickets which indicate no prize.

The system may include a plurality of terminals configured to receive the instant lottery tickets in the first subset for redemption. Optionally, the terminal may be staffed by an agent. The terminals may be configured to redeem tendered lottery tickets in the first subset for the corresponding cash prize in the instant lottery game. The terminals may be further configured, responsive to receiving instant lottery tickets in the second subset for redemption, to generate uniquely numbered raffle tickets. Optionally, an agent may be required to enter the information for generating the raffle ticket.

The system may include a host in networked communication with the plurality of terminals. The host may be configured, responsive to the tender of a lottery ticket in the first subset for redemption at a terminal, to transmit an indication to the terminal that the ticket should be redeemed for an instant win prize. The host may be further configured, responsive to the tender of a lottery ticket in the second subset for redemption at the terminal, to provide the information uniquely identifying a raffle ticket to be generated at the terminal responsive to the tender of the lottery ticket.

The system may optionally include a randomization device, configured to select at least one of the generated raffle tickets as a winner.

The system may optionally include a database in communication with the host, the database configured to store information regarding the generated raffle tickets. The host may be further configured to cause the generation of a record in the database for each generated raffle ticket. Optionally, the randomization device may be configured to randomly select one of the records for generated raffle tickets.

Optionally, the terminals may be configured to include unique human readable identification information on each of the generated raffle tickets. Also the database may be configured to store, with each of the raffle ticket records, the human readable identification information on the corresponding free raffle ticket.

Optionally, the host may be further configured, responsive to the tendering of a winning one of the raffle tickets, to receive information from the tendered raffle ticket and, based on the information, to determine whether the tendered raffle ticket is a winning raffle ticket. Additionally, responsive to determining that the raffle ticket is a winning raffle ticket, the host may transmit information indicating the ticket should be redeemed for a raffle prize.

Example embodiments may include a host for a system for facilitating the play of a game of chance. The host may have a network interface configured to provide networked communication with a plurality of lottery ticket terminals. The host may have an instant ticket redemption control module in communication with the network interface. The redemption control module may be configured to facilitate the redeeming of instant win lottery tickets and generate free raffle tickets when appropriate. The host may have a raffle ticket information generation module in communication with the network interface, the generation module configured to generate free raffle ticket information to send to the networked terminals, when a raffle eligible ticket is redeemed. The host may have a database in communication with the raffle ticket information generation module, the database configured to log data and store raffle ticket records. The host may include a randomization module in communication with the database, the randomization module configured to select one or more winning raffle tickets or records.

Optionally, example embodiments may include a future draw add on raffle.

Optionally, a future draw raffle ticket may be a prize in a future draw lottery game.

Example embodiments of the system for facilitating the operation of a game of chance including a plurality of pre-printed instant tickets displaying game play information beneath removable covering. They system may have a first subset of the plurality of pre-printed instant tickets where the game play information includes an indication that the pre-printed instant ticket is an instant winner of a prize. In one example embodiment, the system may have a second subset of the plurality of pre-printed instant tickets where the game play information comprises a bonus raffle eligibility indicator. The system may have a third subset of the plurality of pre-printed instant tickets where the game play information comprises the indication that the instant ticket is an instant winner of an instant prize in a prize structure and further comprises the bonus raffle eligibility indicator.

Optionally, example embodiments system may have a raffle entry generator configured to generate raffle entries responsive to tickets from the second or third subsets being presented for redemption.

Optionally, one example embodiment may have a raffle outcome generator configured to select at least on of the raffle entries as the winner of a raffle prize. Optionally, the system may include a raffle condition, wherein the raffle winner is chosen by the raffle outcome generator responsive to the raffle condition being met.

Optionally, the raffle condition is a temporal condition.

Optionally, the raffle condition is a number of raffle tickets issued

Optionally, the recipient of an at least one raffle top prize is determined subsequent to the determination of the recipient of the at least one instant winner top prize.

Example embodiments may include a method for facilitating play of a game of chance, including providing a plurality of instant win lottery tickets for at least one instant ticket game, where all of the instant win lottery tickets include game play information for at least one instant ticket game. In one example embodiment at least a subset of the instant lottery tickets have game play information indicating the ticket is a winner of a prize in the instant ticket game. The method may include that responsive to receiving an instant win lottery ticket from the first subset that has been tendered for a prize, the lottery ticket is redeemed for the prize indicated by the game play information on the lottery ticket. In an example embodiment, a counter is incremented with each instant win lottery ticket redeemed and the redeeming is repeated for other ticket holders with lottery tickets in the subset of the instant lottery tickets. The method may include that responsive to the counter reaching a determined value, the ticket holder redeeming an instant win lottery ticket when the counter reaches the determined value is provided with a bonus prize.

Optionally, the bonus prize is may be a cash prize.

Optionally, the value of the cash prize may be variable.

Optionally, the bonus prize may be the top prize in a prize structure for the game.

Optionally, the bonus prize may be awarded after the close of the instant ticket game.

Optionally, the determined value of the counter may be variable

In one example embodiment, a computer readable medium comprising computer readable instructions to perform the methods for facilitating play of a game of chance.

Figure 1B:
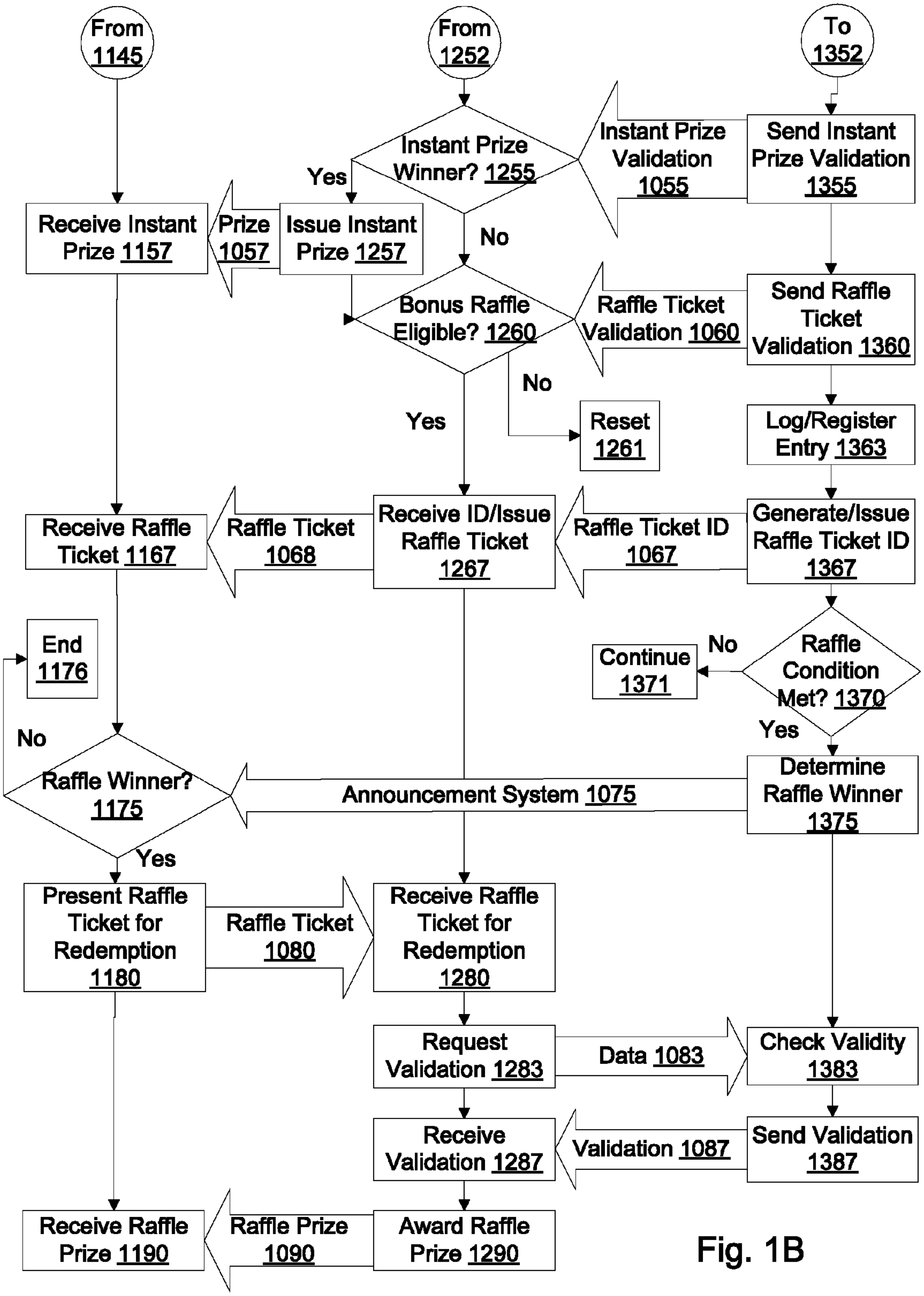

FIGS. 1A and 1B illustrate a flowchart of an example procedure, beginning in FIG. 1A and continuing in FIG. 1B, according to one example embodiment. The procedure illustrated in FIGS. 1A and 1B includes three separate and concurrent flows of control, one for a player, one for a client terminal, and one for a host. The illustrated procedure is just one example embodiment, and is only intended as an illustration. For example, the procedure shows a terminal start at 1210, but, in reality, the terminal may be continually processing multiple iterations of example embodiments. For example, the procedure shows a host start at 1310, but, in reality, the host may be continually processing multiple iterations, facilitating multiple raffles concurrently or consecutively.

In this example embodiment, the procedure illustrates an example player who starts at 1110, an example terminal which starts at 1210, and an example host which starts at 1310. At 1120, a player may request an instant ticket. The transmission of the player's request is illustrated as arrow 1020. This may be a customer at a retail lottery ticket vendor verbally indicating to an agent operating an agent-operated lottery terminal the desire to purchase an instant ticket. It may also include a player entering data inputs on a self-service lottery ticket terminal or kiosk, such as the GTECH GamePoint Lottery Ticket terminal available from GTECH Corporation of Providence, R.I. Alternatively, the entry of the request to obtain a ticket may be carried out on a home computer, by a user navigating to an appropriate Website and requesting the online purchase of an instant lottery ticket (e.g., with a personal computer, or mobile device).

In 1220, the terminal may receive the player request to obtain the instant lottery ticket. The player may be required to pay for the instant lottery ticket at 1123, prior to obtaining the ticket. In some alternatives, e.g., in games similar to the "Pick 'n Play Game" from GTECH Corporation, pre-printed game cards may be provided to players for free, and then activated after the payer pays for a game play. A transfer of money is indicated by the arrow 1023. The payment may be received by the terminal at 1223. This may be a player handing a terminal operator cash or some other form of accepted payment. Alternatively, the receipt of payment may be from a player providing a form of payment at the terminal (e.g., entering credit card information on a home computer, depositing cash into a self-serve vending machine, swiping a credit, debit, or prepaid card, or any other conventional approach for transfer of funds). Next, the terminal may report the ticket purchase to the host and request activation of the ticket at 1225. The data transmission, as well as the data required to activate the ticket is transmitted to the host at 1025. The data transmissions illustrated in FIGS. 1A and 1B could be of any variety; for example, a synchronous protocol with multiple messages, asynchronous packet sent to an online transaction processing system and response, automated email queries, transfer of secure tokens, communications through proxies, or any other known transmission protocol or method.

At 1325, the host may log the purchase information, ticket information, or any other assortment of relevant data associated with the sale of an instant win ticket. The host will also receive the activation request information, and at 1327 will send the terminal an activation confirmation if activation was successful. The host may also send an error if activation was not successful so that the terminal may select a different ticket, and the terminal and host may repeat the steps for that ticket. Once the terminal has received that activation confirmation 1027 at 1227, the terminal will be ready to provide the instant ticket to the player at 1230. FIGS. 1A and 1B illustrate an example embodiment which requires ticket activation in 1225 to 1227. However, other example embodiments in addition or alternative to this, may sell tickets that do not require activation. For these example embodiments, the terminal may optionally report the purchase, but need to request or receive an activation for the ticket. In this respect, the tickets may be sold without the use of a terminal device until redemption occurs. In the example embodiment of FIGS. 1A and 1B, instant ticket 1030 is received by the player at 1130. This may be a physical ticket handed to a customer at a retail lottery ticket location, or may be a printable graphic on a user device (e.g., personal computer). Alternatively, it may be the case that no actual ticket in any form is given to the customer, and that the host retains all of that information, and the player is only given a confirmation of entry. However, in the example embodiment illustrated by FIGS. 1A and 1B, the player may be given an instant ticket of the "scratch off" variety. A scratch off ticket is one in which the winning information is concealed by an opaque cover the player may remove (e.g., by scratching the cover off of the ticket).

At 1140 the player may scratch off the instant ticket to reveal game play information which provides at least some indication of the ticket's value or prizes to be awarded upon redemption of the ticket. Alternatives to an actual "scratch off", peel-off, pull-tab, or other physical uncovering of the game play data, may include hitting a button, or performing a virtual "scratch off" with an input device (e.g., a mouse or touchpad). The player may then present the ticket for redemption at 1145. Generally, if the ticket indicates no prize was won, the player would not present it, but this does not preclude the terminal or host being able to identify a ticket with no associated prize. The instant ticket 1045 may be received for redemption by the terminal at 1245. The terminal may then request validation at 1250, by sending the relevant data 1050 to the host. In this example embodiment, the terminal may send relevant information in data 1050, which may allow the host to validate the ticket and determine what prizes are associated with that ticket. The host may then check the validity of the instant win ticket at 1350, and send back a validation 1052 at 1352. Of course, if the ticket is invalid, the host may return an error. The terminal may then receive the validation at 1252. Next, the terminal may determine if the instant ticket is an instant prize winner at 1255. In this example embodiment, the determination is made based on an Instant Prize Validation 1055 sent by the host at 1355. This Instant Prize Validation 1055 may inform the terminal if an instant prize is required. Instant prizes may be of any type where the value is immediately determinable, such as cash, credits, prizes, or a free instant win lottery ticket. If the instant ticket is an instant prize winner, the terminal (or terminal operator) may issue the player the appropriate instant prize 1057 at 1257. The player may receive the instant prize at 1157. This may be, for example, cash, credits, a free ticket, etc.

After 1257 or if no prize is due at 1255, the terminal may next determine if the ticket is eligible for the bonus raffle at 1260. Similar to before, this determination may be based on information such as Raffle Ticket Validation 1060, which may be sent from the host at 1360 to the terminal. If the ticket is not bonus raffle eligible, then the procedure will reset at 1261. In reality, example embodiments may be procedures which are constantly running at multiple locations, for multiple players, and restart for other players while still executing for a first player. FIGS. 1A and 1B are an illustration of one example embodiment.

If Raffle Ticket Validation 1060 indicates that no raffle ticket has been won, then the host procedure may also reset (not shown), and not finish the procedure 1363 to 1387 for this player/ticket. If, however, a raffle ticket was indicated by Raffle Ticket Validation 1060, then the host may next Log and Register the Entry at 1363. The host may then Generate and Issue a Raffle Ticket Identifier (ID) 1067 at 1367. This may include the raffle number which was entered into the drawing, and any other information required by the terminal to print Raffle Ticket 1068. If the ticket is bonus eligible at 1260, then at 1267 the terminal may receive the Raffle Ticket ID 1067 and issue a Raffle Ticket 1068 to the player at 1267. Raffle ticket 1068 may be a physical ticket or a confirmation of a virtual ticket, and may be received by the player at 1167.

Subsequent to 1367, the host may determine if the raffle condition has been met at 1370. If not, the host may continue at 1371. If the raffle condition is not met, more players or the same player may purchase instant win tickets, and tickets with raffle eligible indicators may be redeemed for additional raffle tickets. The raffle condition may be a set date, or may be when a set number of raffle tickets are issued. Alternatively, it may be a combination of the two, for example, the raffle may be conducted at the later of some date or the issuing of some number of tickets. In the case of a set date, a raffle may be conducted with all the redeemed tickets from the last week, month, or any other configurable period of time. This has a benefit of allowing players to know the exact date of the drawing, but also has the drawback of a potentially variable number of raffle tickets. It may be appreciated that an implementation using the fixed date raffle drawing may reduce the variability in the number of issued raffle tickets by setting a draw date well beyond the expected date of issuing the desired number of tickets. For example, say an average of 100 raffle eligible tickets are redeemed each week (thus 100 raffle tickets are issued per week on average), and the procedure operator would like to conduct a raffle with 100 tickets in each raffle, but would also like the holders of raffle tickets to know the date of the drawing. This operator may implement an example procedure by setting the date of the drawing two, three, or more weeks from the date the first ticket is issued. Then the procedure may put the next 99 tickets in for that drawing date and repeat the procedure. In this way, the date will be fixed for all customers and there will be a fixed number of tickets in each drawing (e.g., 100) unless the two, three, or more weeks following the setting of the drawing date experience an unusually low level of issued raffle tickets. Additionally, example embodiments may allow instant win redemptions for raffles of later lottery games. For example, say one million tickets were printed with ten thousand raffle eligible indicators located on tickets. The tickets with indicators may be redeemable for a raffle drawing which will occur when all one million tickets have been sold. At the time the millionth ticket is sold, only nine thousand of the ten thousand tickets which have raffle ticket eligible indicators on them are redeemed. The raffle may then be conducted with the nine thousand entrants and one or more winners selected. In some embodiments, the remaining one thousand instant lottery tickets with raffle eligible indicators may be void as to that prize. However, in other embodiments, the one thousand remaining tickets may be redeemable for entry in the raffle which may be conducted when all one million tickets from the next lottery game are sold out. These are only a few examples, the condition upon which a raffle is conducted could be any number of things. When the raffle condition is met, the host may determine a raffle winner at 1375. The host may use a random outcome generator to select from among the raffle tickets one or more winning tickets. Regardless of how the winning raffle tickets are chosen, the procedure may have an announcement system 1075 to inform customers of the results. This could be, for example, contacting customers with contact information that was entered into the system, printing the results in some publication (e.g., the newspaper or a Website), or any other information distribution method.

At 1175, the player may determine if they are holding a winning raffle ticket. If not, the player procedure will end at 1176. The player may purchase another ticket, or may have other raffle tickets to check. If the player does have a winning raffle ticket, that player may present the Raffle Ticket 1080 for redemption at 1180. The terminal, which may be a different terminal than the one which sold the ticket, may receive the raffle ticket for redemption at 1280. The terminal may request validation at 1283 by sending relevant Data 1083 to the host, which may check the validity of the raffle ticket. The host may send a Validation 1087 at 1387 if the ticket is valid. The terminal may receive that validation at 1287, and award the appropriate raffle prize 1090 at 1290. Alternatively, the host may provide instructions on how to receive the award, as it may be too large for an at terminal awarding, or structured over time such as an annuity. In the example embodiment illustrated by FIGS. 1A and 1B, the terminal may award the Raffle Prize 1090. The player may receive the raffle prize at 1190. The procedure may repeat linearly or concurrently any number of times during a single raffle period, or for multiple raffle periods. Example embodiments may include several players, each having one or more tickets, one or more raffle tickets, one or more cash prizes, one or more terminals, one or more terminal operators, a single host, a distributed host, or any combination of these things not specifically illustrated in FIGS. 1A and 1B.

Figure 2A:
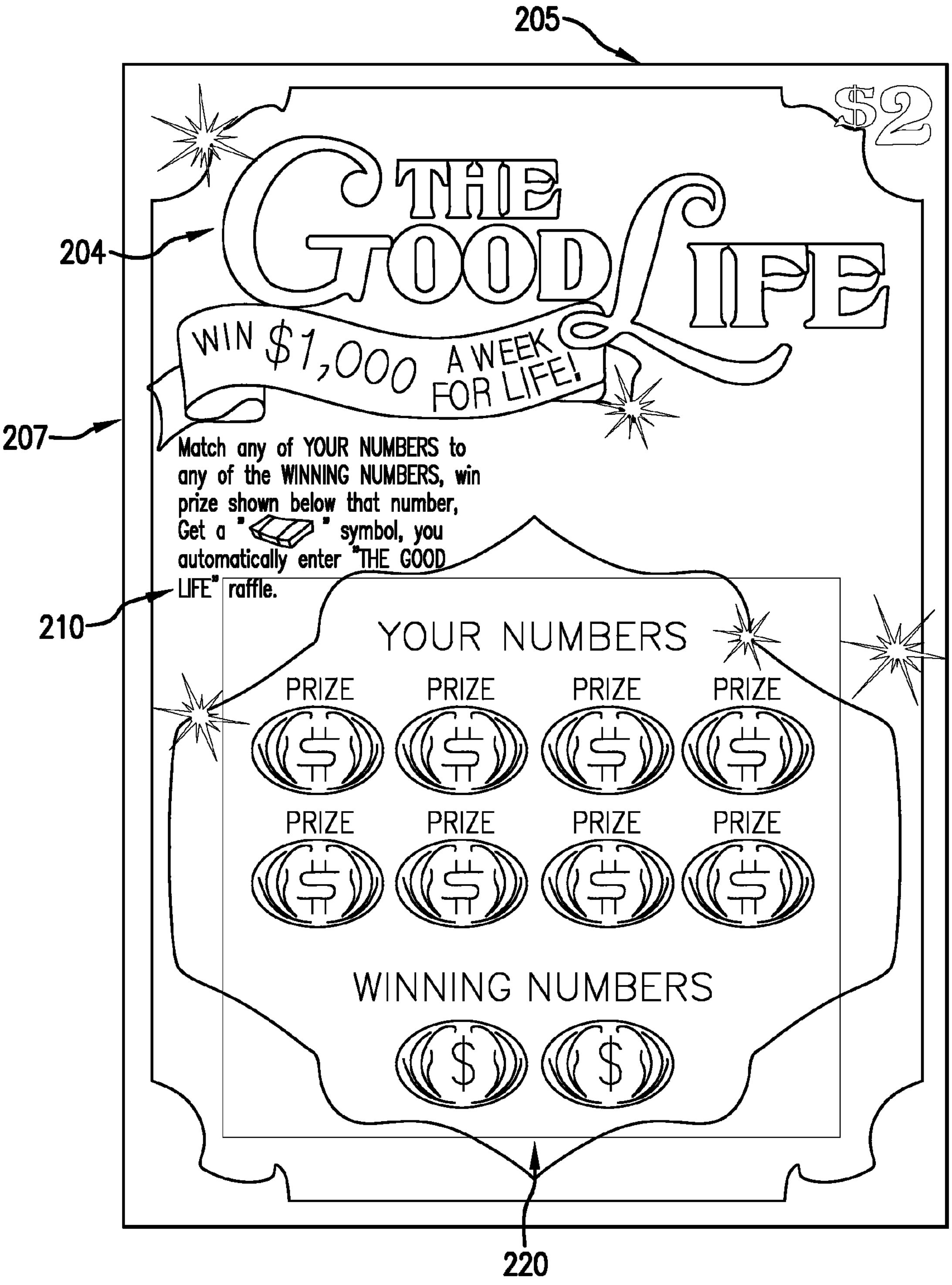
FIG. 2A illustrates an example instant win lottery ticket which is one example embodiment and may also be used in conjunction with example embodiments.
Figure 2B:
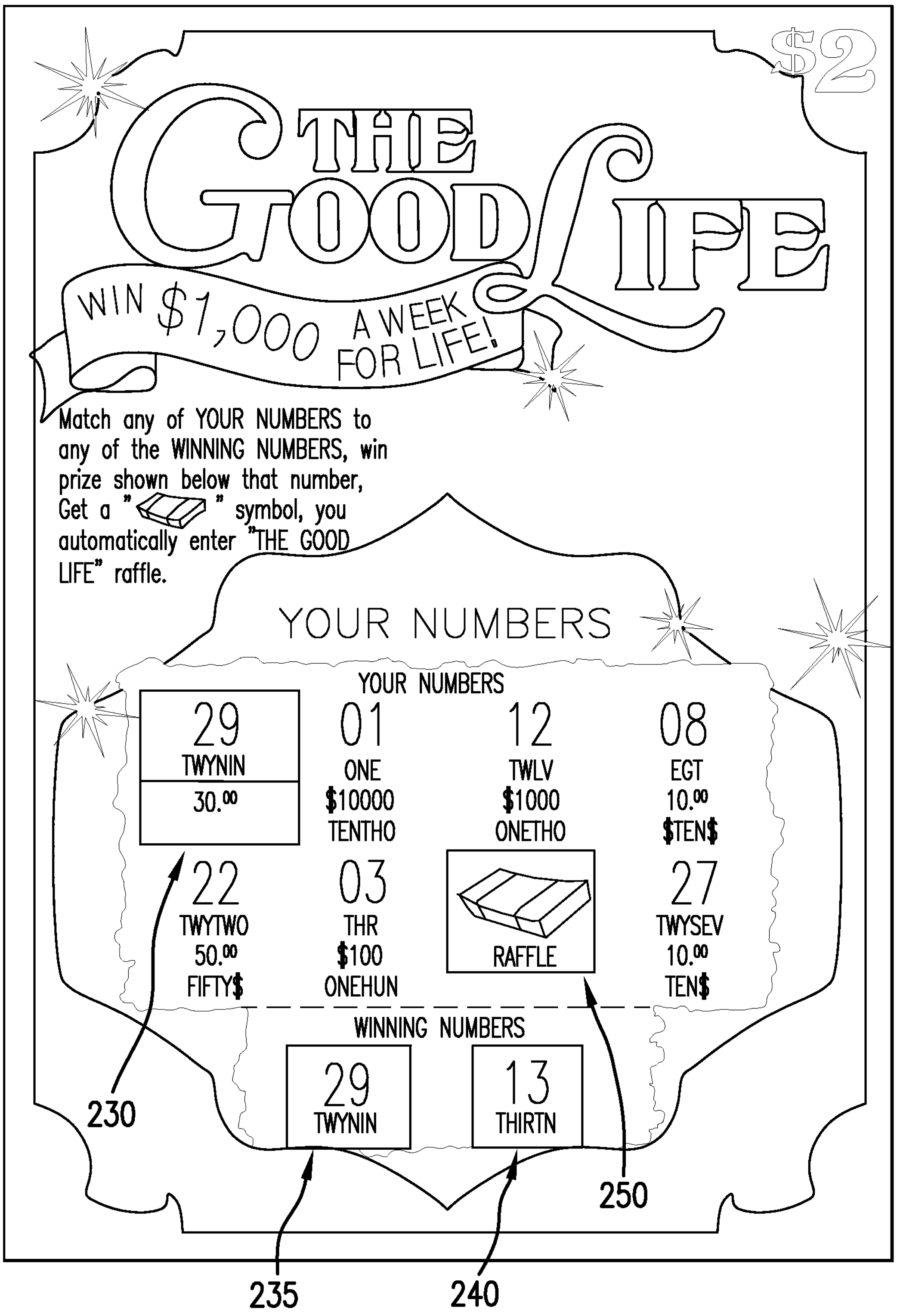
FIG. 2B illustrates another example of an instant win lottery ticket which is one example embodiment and may also be used in conjunction with example embodiments.
Figure 2C:
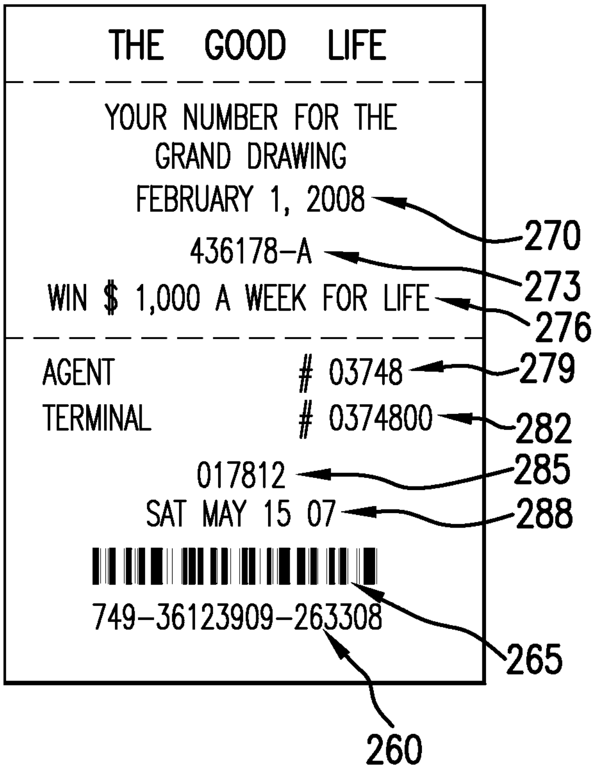
FIG. 2C illustrates an example raffle ticket which is one example embodiment and may also be used in conjunction with example embodiments.

FIGS. 2A and 2B illustrate an example instant win lottery ticket which is one example embodiment, and may also be used in conjunction with example embodiments. FIG. 2C illustrates an associated raffle ticket, according to an example embodiment. These tickets, or other alternative tickets with similar features may be used with the example systems and methods described in the present application. FIG. 2A shows an example instant win scratch off ticket. Region 210 includes instructions on how to play the game printed on the ticket substrate. These instructions include information indicating how to determine what prize, if any, the example ticket qualifies for. Region 220 contains a removable cover, for example, a conventional latex cover a player may scratch off to reveal a layer underneath. The ticket also may include information 205 that indicates the cost of the ticket. The ticket indicates the name 204 of the instant win lottery game, and also includes information 207 indicating one of the prizes available in the game, preferably the top prize available to any player of the ticket.

In FIG. 2B the same ticket as FIG. 2A is shown, but with the removable cover removed (e.g., scratched off). As can be seen, and as the instructions on the card indicate, if any of the numbers from the eight numbers in the "YOUR NUMBERS" region 220 match any of the numbers in the "WINNING NUMBERS" region 220, the ticket will be redeemable for the amount indicated under the number.

As shown at 240, the number thirteen is a winning number, but is not located in the "YOUR NUMBERS" region of 220. However, 235 shows that the number twenty-nine is also a winning number and that number does appear at 230. As such, the holder of this ticket may be awarded thirty dollars, as indicated under the customer number 230. This is just one example using numbers, any matchable entity would work (e.g., letters or symbols) in a similar way, and prizes may be indicated using some technique other than matching.

FIG. 2B also illustrates an indication 250 of a raffle ticket qualification. In this example ticket, the raffle qualification is in addition to the instant win prize. The holder of the ticket illustrated in FIG. 2B would be entitled to an instant win prize of thirty dollars and also to a free raffle ticket. It will be appreciated that alternative tickets could be non-prize winners, instant cash prize winners only, or raffle ticket winner only. It will also be appreciated that, as in conventional instant ticket games, a particular game may include one or more "books of tickets", each with a predetermined mix of winning tickets with particular prizes. When very large prizes are awarded, these might only be found in a single one of a large group of books of tickets, or they might be awarded only through the raffle mechanism described in some of the example embodiments disclosed in the present application. For example, a particular game might consist of 10,000 books of 100 tickets each for a total of one million game tickets, each book having a pre-set number of smaller $5 and $10 prizes and a single $500 prize, as well as 10 raffle ticket winners, each of which are eligible to win a single million dollar grand prize. In contrast, in a conventional instant game, the single million dollar grand prize might be assigned to a single one of the 1 million tickets.

The ticket shown in 2B and 2A may also have a barcode and serial number printed on the front or back of the ticket (not shown), which may uniquely identify the ticket and include relevant information about the ticket, including information required to validate the ticket when it is presented for redemption. This barcode and serial number may also implement anti-tamper measures, and the ticket may contain additional security measures. For example, the instant ticket validation schemes described in U.S. Pat. No. 7,311,599 to Knapp may be employed.

FIG. 2C illustrates an example embodiment of the above-mentioned free raffle ticket. Upon redemption of the ticket illustrated in FIG. 2B, a raffle ticket illustrated in FIG. 2C may be generated and issued to the customer. The ticket may indicate the raffle drawing date 270, and may have instructions on how to get the results and what to do if the ticket is selected. The ticket may also have other relevant information such as the date the ticket was generated 288, the agent 279 and/or terminal 282 the ticket was generated on, and a range of validation or security measures to prevent cheating. The ticket may have a barcode 265 with a corresponding human readable number 260. The barcode may contain information about the raffle ticket, including the identity of the instant lottery ticket that was redeemed for a free raffle ticket, the ticket serial number, the location where the ticket was generated, the identity of the drawing for which the ticket is eligible, and a validation or authentication code. The ticket may have a human-readable drawing identifier 285. The ticket may indicate the prize which may be awarded to a winning ticket 276. Additionally, the ticket may contain the raffle number 273, such that if this number is selected, the ticket may be redeemed for the raffle prize. The raffle number 273 may contain a series identifier, e.g., the "-A" of FIG. 2C. In this way, more than one raffle ticket of the same number may be generated and thus there may be more than one winner per winning number. For example, if "436178" was the winning number, then the holder of the ticket in FIG. 2C would be a winner, and any holder of a ticket with number "436178-B" would also be a winner.

Some alternative example embodiments may enter eligible customers in the raffle without issuing a ticket or in conjunction to issuing a ticket, by taking down the identifying and contact information of the entrants, to be associated with an entry in the raffle. Winners may then be contacted regarding their status and may not be required to retain their entry ticket for future redemption. This may reduce cheating via fake entry tickets, and may reduce customer annoyance at having to retain a physical entry ticket. This example may not be the preferred embodiment for some contexts, as some operators may factor a certain number of unclaimed raffle prizes into the profit structure of operating the game. It is also appreciated that a single instant lottery ticket may produce multiple raffle entries, or allows the player to receive a plurality of raffle tickets. In one example embodiment, the plurality of raffle tickets or entries may be for use in a single subsequent raffle. In one example embodiment, the plurality of raffle tickets or entries may be for use in a plurality of subsequent raffles.

Figure 3:
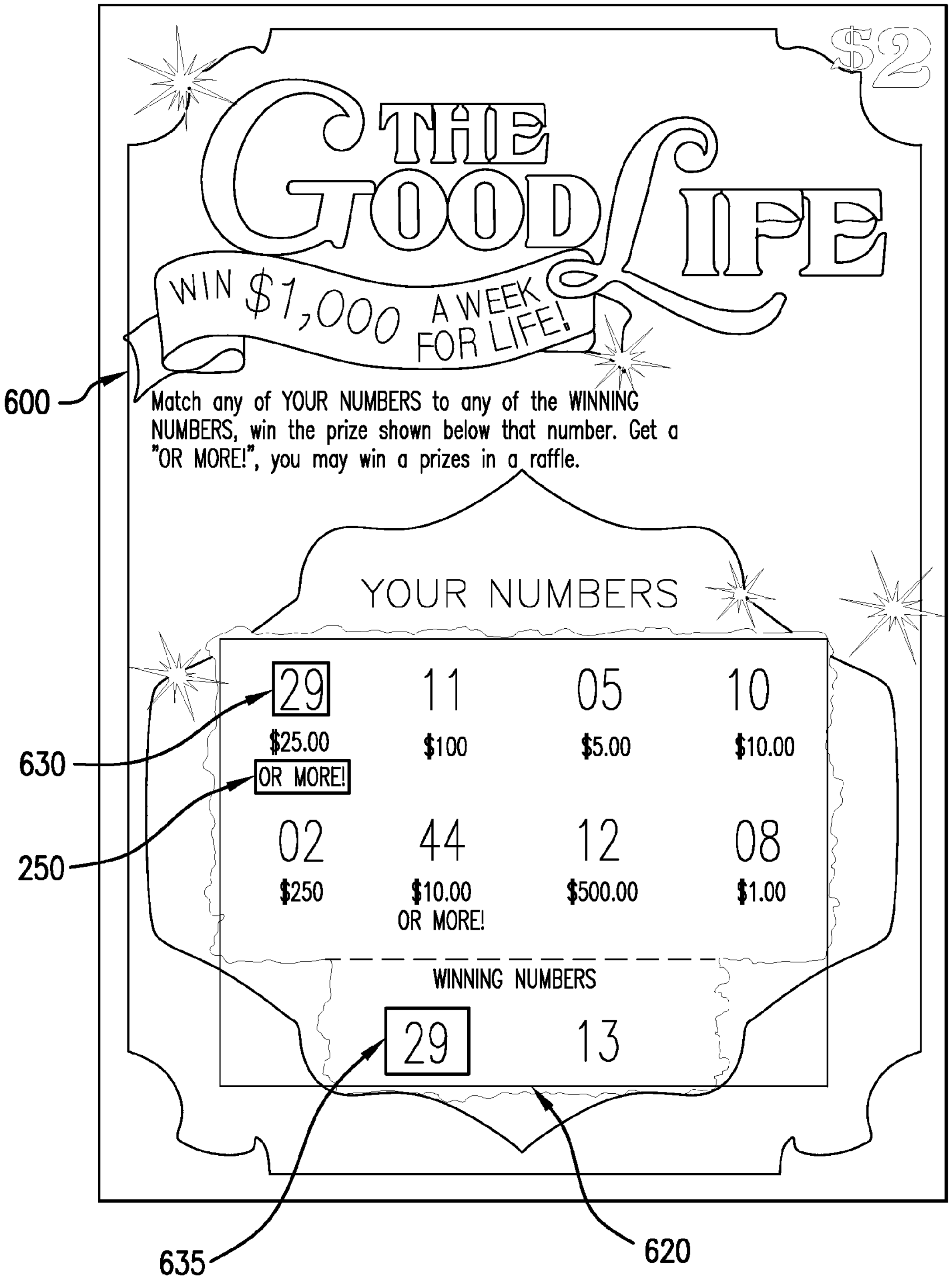
FIG. 3 illustrates another example of an instant win lottery ticket which is one example embodiment and may also be used in conjunction with example embodiments.

In one example embodiment, the indication 250 may be associated with an instant prize amount. For example, the indication 250 may be "OR MORE!". Accordingly, the prize amount on the ticket may be listed as "$5 OR MORE!" or "$20 OR MORE!". It is appreciated that the indication 250 may be associated with both monetary and non-monetary prizes, such as free tickets. FIG. 3 illustrates one example embodiment an instant win lottery ticket. This ticket, or other alternative tickets with similar features, may be used with the example systems and methods described in the present application. Region 600 includes instructions on how to play the game printed on the ticket substrate. These instructions include information indicating how to determine what prize, if any, the example ticket qualifies for. As shown in FIG. 3, the instant ticket is illustrated with the removable cover removed (e.g., scratched off). As can be seen, and as the instructions on the card indicate, if any of the numbers from the eight numbers in a "YOUR NUMBERS" region 620 match any of the numbers in a "WINNING NUMBERS" region 620, the ticket will be redeemable for the amount indicated under the number.

As shown at 635, the number twenty-nine is a winning number and that number appears at 630. As such, the holder of this ticket may be awarded twenty-five dollars, as indicated under the customer number 630. This is just one example using numbers, any matchable entity would work (e.g., letters or symbols) in a similar way, and prizes may be indicated using some technique other than matching. In this example ticket illustrated in FIG. 3, the raffle qualification is in addition to the instant win prize. The holder of the ticket illustrated in FIG. 3 would be entitled to an instant win prize of twenty-five dollars and, upon redemption, also entered into a subsequent raffle for additional prize or prizes due to the "OR MORE!" designation. It is appreciated that other designations, such as other words or symbols, may be used. It will be appreciated that not every ticket with an instant prize will also include an indication 250. Further, it will be appreciated that the indication 250 may be associated with prizes of all levels, or only select levels. In one example embodiment, the additional prize awarded during the subsequent raffle may be the top prize in the prize structure.

As illustrated in FIG. 4, a prize structure 640 for an example game of chance may include three top prizes. Two of the top prizes may be awarded to instant winners. For example, the top prize may be $100,000 and two tickets are printed that list $100,000 as the award amount. The claimant of the third top prize may be selected from the group of redeemed tickets with the "OR MORE!" indication. The selection of this bonus prize winner may occur at any point during the game, such as at the close of the game. It is appreciated that the prize structure 640 may comprise any suitable prizes, quantities of tickets, and prize values. As illustrated in the example prized structure 640, a subset of winning tickets for each instant prize level may include a plurality of tickets with an "OR MORE!" indication. In one example embodiment, as the award level for the instant prize level increases, the number of tickets for that prize level also having an "OR MORE!" indication decreases.

Figure 5:
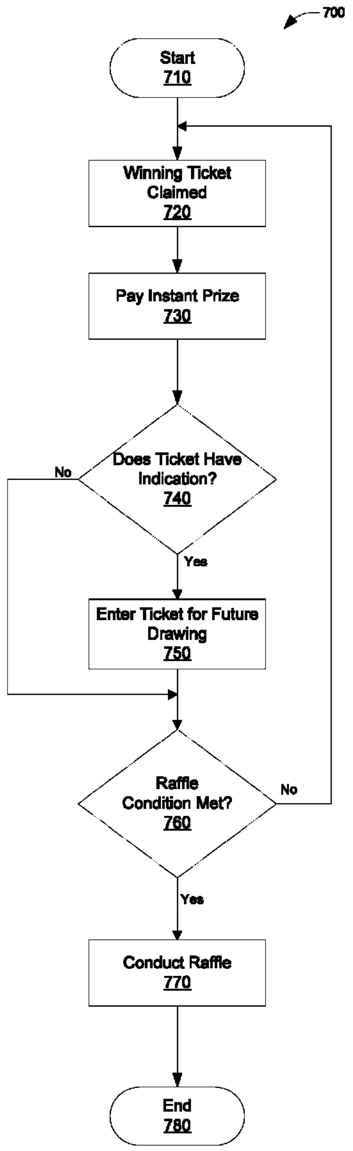
FIG. 5 is a flowchart of an example procedure, according to one example embodiment.
Figure 7:
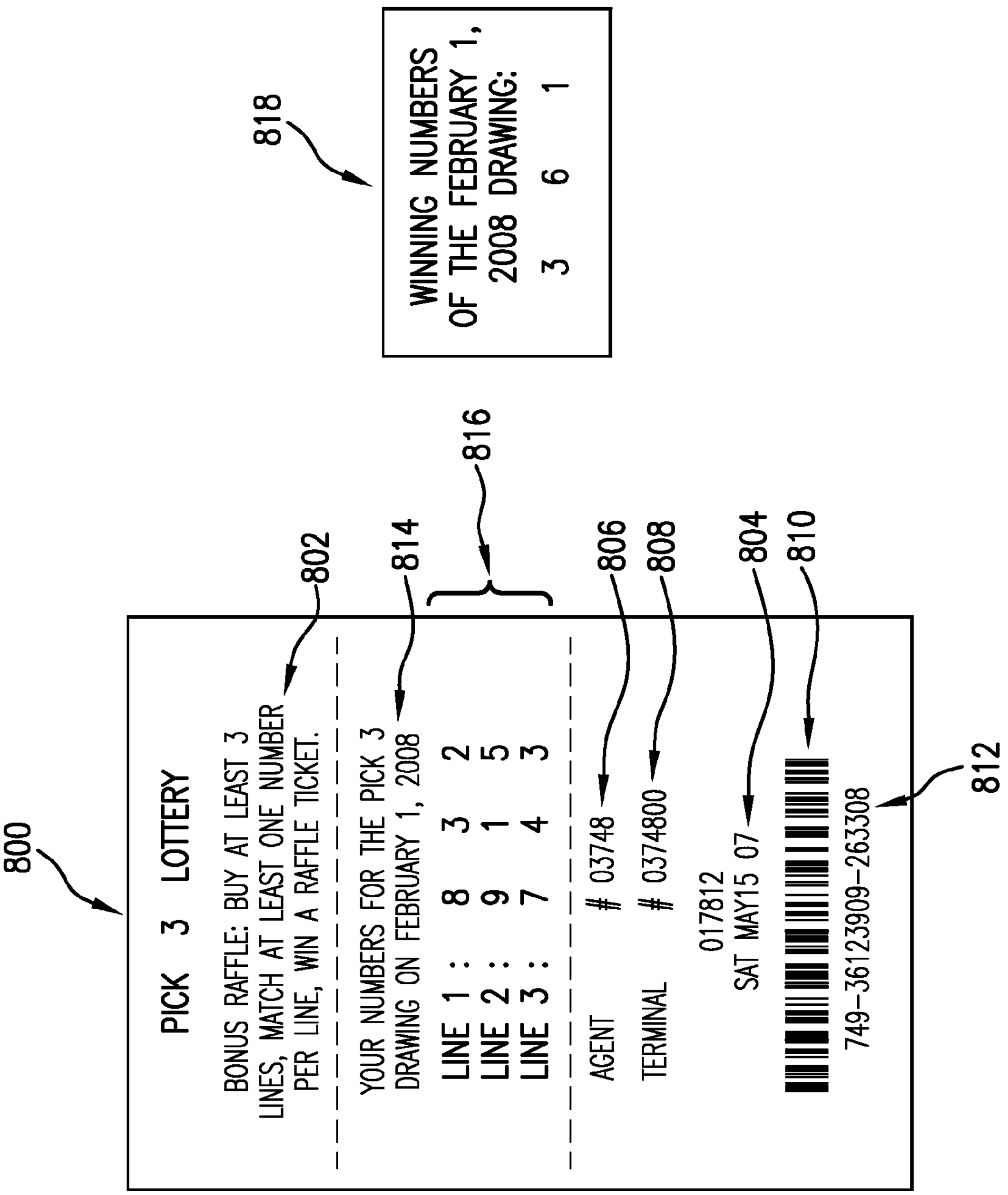
FIG. 7 illustrates an example of a lottery ticket which is one example embodiment and may also be used in conjunction with example embodiments.

FIG. 5 is a flowchart of an example procedure 700, according to one example embodiment. FIG. 5 illustrates a repeating procedure of an example embodiment of a host (FIG. 7). The host component may include numerous functions in addition or alternative to what is shown in FIG. 5, and FIG. 5 is an example illustration of the host conducting a raffle on a repeating basis. The procedure may start at 710 and look for the claiming of a winning ticket at 720. The procedure may then pay the instant prize at 730. The procedure may then determine if the ticket has an indication at 740, such as an "OR MORE!" indication. If the ticket has an indication, the ticket may be entered into a future drawing at 750 and then the host may determine if a raffle condition is met at 760. If the ticket does not have an indication, the procedure may proceed to determining if the raffle condition is met at 760. As discussed for prior embodiments, the raffle condition may be a date or when a certain number of tickets have been sold or redeemed. There may be many raffles consecutively or concurrently. A lottery game (e.g., a printing of a million tickets) may have a certain number of tickets with raffle eligible indicators. The host may enter all the tickets redeemed during a specific period into a specific raffle, and tickets redeemed after that period may be entered into a subsequent raffle. If the raffle condition is met, the procedure may conduct the raffle at 770, which may include selecting one or more raffle winners from the redeemed instant lottery tickets. The one or more raffle winners may win one or more prizes of equal or varying value. In one example embodiment, the raffle winner is awarded a top prize in the prize structure. After awarding of a prize or prizes, the procedure may end at 780 or may return to waiting for winning ticket claimants at 720. If the raffle condition is not met at 760, the procedure may return to waiting for winning ticket claimants at 720. It may be the case that a lottery game (e.g., a printing of a million tickets) will have one raffle or may have more than one raffle.

In one example embodiments, a bonus prize may be paid to the claimant in addition to the instant prize based on the relative redemption position of the claimant. For example, a bonus prize may be paid to the tenth, hundredth, or thousandth claimant of a winning ticket. The redemption position may be determined by any suitable technique. It is appreciated that particular redemption position that triggers the bonus prize may vary per prize amount and/or per game. Furthermore, the bonus prize paid to the claimant may vary depending on the instant prize amount. For instance, a $2 instant winner prize amount may have an $8 bonus prize associated with it, whereas a $50 instant winner prize amount may have a $50 bonus prize associated with it. In one example embodiment, a top prize in the prize structure may be awarded as a bonus prize based on redemption position. In some implementations, once the last instant top prize is claimed, a counter could begin to increment with each redeemed winning ticket for the various instant winners. It is appreciated that a networked database, or other suitable computing device, may be used to facilitate the necessary and desired logging of system events, such as the redemption of winning tickets at multiple locations. When the counter reaches a specified number, such as one hundred or five thousand, the claimant redeeming a winning ticket would receive the top prize as an additional bonus prize. Accordingly, that particular claimant may be redeeming a winning ticket with a relatively small instant prize amount (such as $2), but win the top prize in the prize structure as a bonus prize due to their redemption position.

Figure 6:
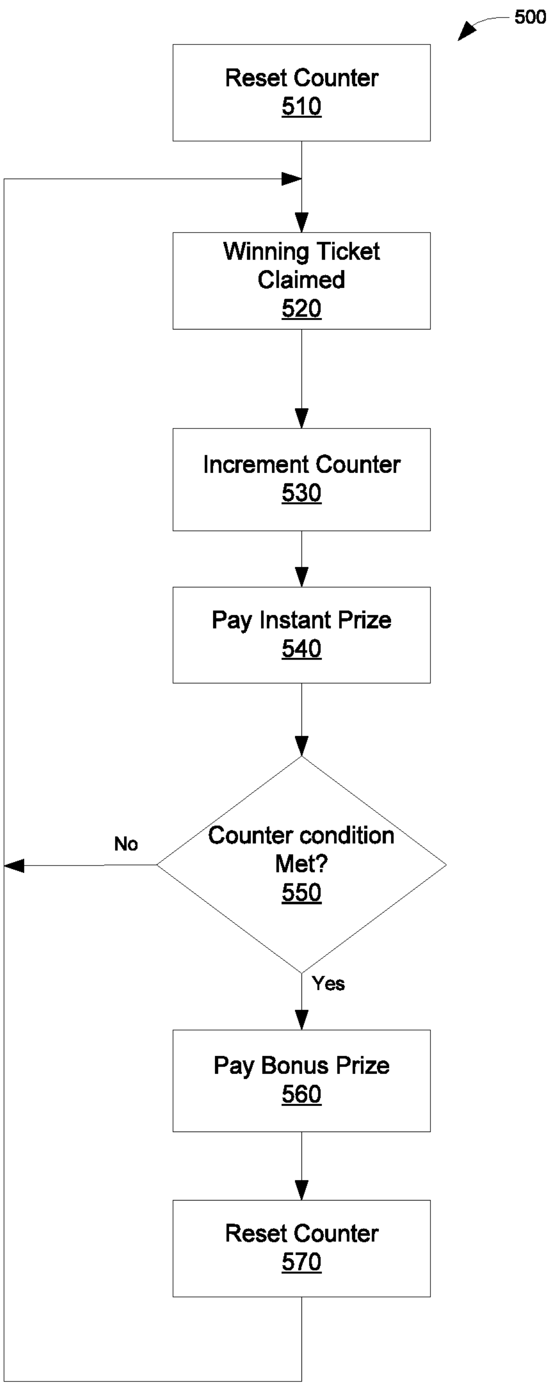
FIG. 6 is a flowchart of an example procedure, according to one example embodiment.

FIG. 6 provides an example embodiment of a process 500 based on redemption position. At 510 the counter is reset. The counter could be reset for a variety of reasons. For example, the counter may be reset if the last instant top prize in the prize structure is redeemed or the bonus prize for a particular prize level (i.e., $50 prize) is redeemed. Additionally, it is appreciated that a plurality of counters may be used. At 520 a winning ticket is redeemed. It is appreciate that the winning ticket may be redeemed though any suitable means, such as through an agent, on-line, or at a terminal. Upon redemption, the counter is incremented at 530. At 540 the claimant is paid the instant prize amount listed on the ticket. The redemption position of the claimant is then checked to determine if a bonus prize should be awarded. The counter is compared to counter condition at 550. The counter condition may be, for example, a count of 500 or 1000. If the counter condition is satisfied, the claimant is paid a bonus prize as step 560. The counter is then reset at 570. If the counter condition is not met at 550 the claimant is not eligible for a bonus prize.

FIG. 7 illustrates an example "Pick 3" lottery ticket 800 which includes a chance to win a raffle ticket for entry into a subsequent bonus raffle. It is appreciated this embodiment may also be used in conjunction with other embodiments, such as "Pick 4" lottery tickets, for example. The lottery ticket 800 may include an instruction section 802. In one example embodiment, if the player purchases at least three lines of numbers, and matches at least one number in each line to the winning numbers, the player is eligible to receive a raffle ticket for a subsequent drawing. The ticket 800 may also have other relevant information such as the date the ticket was generated 804, the agent 806 and/or terminal 808 the ticket was generated on, and a range of validation or security measures to prevent cheating. The ticket may have a barcode 810 with a corresponding human readable number 812. The ticket may have the date of the next lottery drawing 814. The ticket may also include a listing 816 of the player's lottery numbers that comprises a plurality of lines of numbers. It will be appreciated that the player's lottery numbers in each line may be individually selected by the player or may be generated randomly by a computer. A listing of winning numbers is illustrated at 818. As will be appreciated, the listing of winning numbers 818 is generated by a random drawing subsequent to the generation of the ticket 800. As illustrated, each line in the listing 816 on the lottery ticket 800 matches at least one number of the winning numbers. Specifically, Line 1 has matched the "3," Line 2 has matched the "1," and Line 3 has matched the "3." Accordingly, although the player did not match all of the winning numbers with a single line in the listing 816, the player is eligible to receive a raffle ticket for a subsequent raffle drawing. The raffle drawing may include, for example, a plurality of tickets that have matched at least one winning number in each of at least three lines of numbers. At least one winner may be selected from the plurality of tickets. The winner, or winners, of the raffle may win a prizes or prizes. It is appreciated, that other rules of play may be utilized in other embodiments. In one example embodiment, the player must purchase four lines of numbers in a Pick 4 lottery and match one number in at least three lines to the winning numbers.

Figure 8:
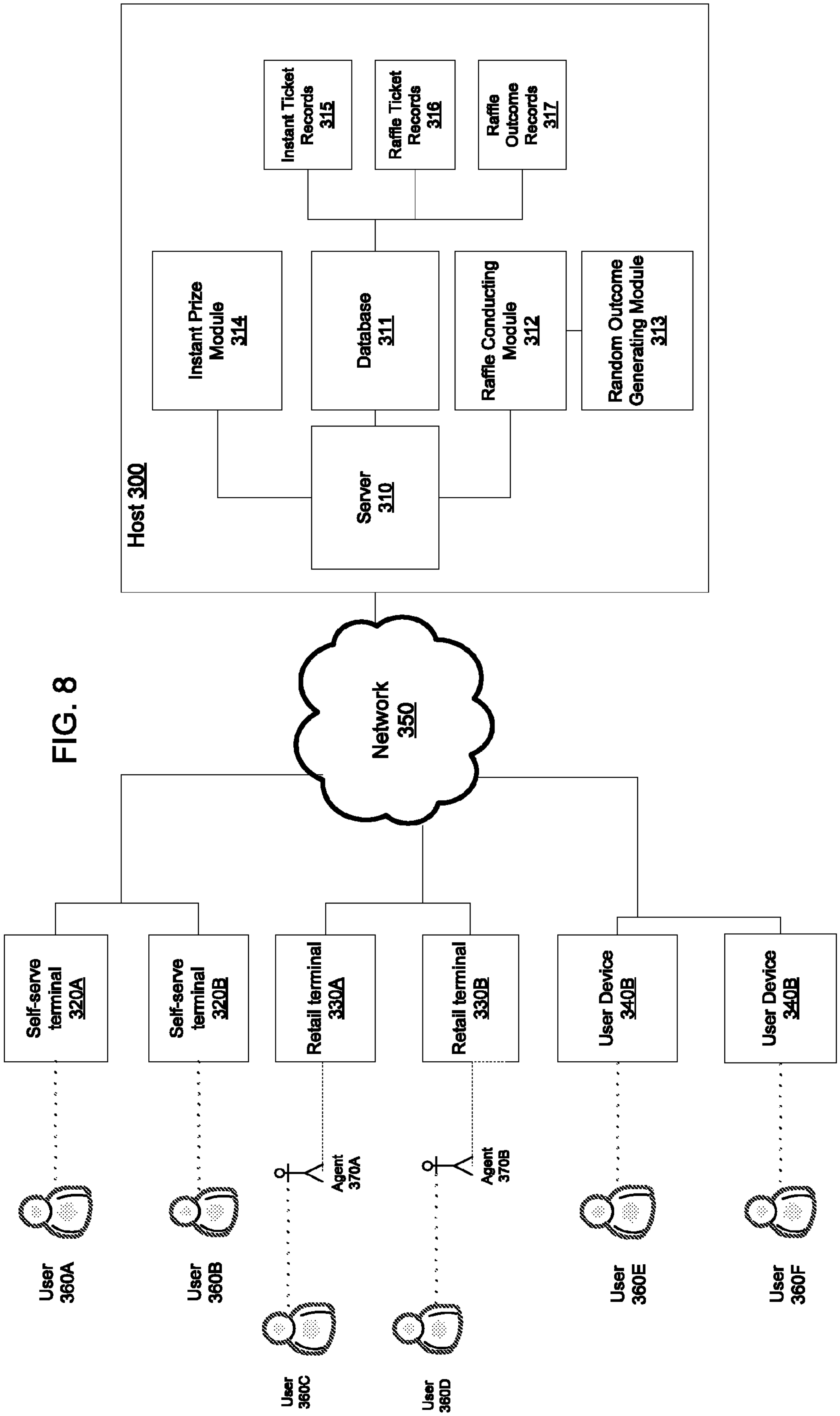
FIG. 8 is an illustration of an example system, according to one example embodiment.

FIG. 8 is an illustration of an example system, according to one example embodiment. In this example system there is a Host 300, which contains a Server 310. Server 310 may be a single central server, a plurality of distributed servers, or any other example embodiment capable of facilitating the components of Host 300. The Server 310 may have a Database 311 to facilitate operation of the server and to facilitate necessary and desired logging of system events. The database may be used to store the identification and/or contact information of raffle entrants and/or winners. The database may log sales, issued numbers, draw dates, or any other information relevant to the system operator. The database may store information such as what instant prizes are associated with what identifying information associated with a ticket and transmitted to the Server 310 (e.g., a barcode on the ticket transmitted to the server which looks up what prizes that are associated with that ticket). The database may store Instant Ticket Records 315, Raffle Ticket Records 316, and Raffle Outcome Records 317. There may be an Instant Prize Module 314 responsible for facilitating the awarding and verifying of instant prizes. There may be a Raffle Conducting Module 312 responsible for facilitating the issuing and generating of raffle ticket numbers and the conducting of the raffle game upon a game initiating condition. The Raffle Conducting Module 312 may have a Random Outcome Generating Module 313, responsible for selecting one or more raffle winners at random, or one or more winning raffle tickets at random.

The Host 300 may be connected to a Network 350 (e.g., the Internet) to a plurality of Self-serve terminals 320. These terminals may allow a User 360 to purchase an instant win ticket at the terminal. The customer may be forced by game policy to redeem the ticket at a non-self-serve location. Alternatively, the Self-serve terminals 320 may be able to redeem prizes and issue raffle tickets when appropriate. If this example embodiment is used, the tickets sold will preferably have a tamper proof/resistant identification system so that Server 310 knows what instant win prizes and how many raffle tickets to issue to the customer at that Self-serve terminal 320. Alternatively, Self-serve terminals 320 may be limited to "virtual instant win tickets" where the self-serve terminal 320 has a video display and issues the customer an instant win ticket without actually giving the customer a physical ticket which might have been tampered with. In this way, a self-serve terminal may be able to dispense both physical tickets and "virtual tickets" but may be limited to only redeeming virtual tickets. The virtual tickets may operate exactly like the physical tickets, and may even represent physical tickets located in the Self-serve terminal 320 or another device in communication with the Host 300 or Self-serve terminal 320, but differ in that the customer is never given physical control over the ticket prior to redemption. The Self-serve terminal 320 may also be limited to small prize redemptions, and customers with large wins may need to visit a non-self-serve terminal for verification and redemption.

The Host 300 may be connected via a Network 350 (e.g., the Internet) to a plurality of Retail locations 330 or "non-self-serve" locations. One example of these may be a retail sales point at a convenience store or gas station where a human attendant may sell the tickets and/or redeem tickets. The Retail terminal 330, in connection with the Host 300, may generate for and issue to a customer a raffle ticket when the customer's ticket has an eligibility indicator. The Retail terminal 330 may require operation by an Agent 370 to sell tickets to Users 360 and redeem tickets for Users 360.

Host 300 may be connected via Network 350 (e.g., the Internet) to a plurality of User Devices 340. These may, for example, be cell phones, PDAs, notebook computers, or personal computers. The User 360 may use the User Device 340 to purchase instant lottery tickets in a similar fashion as the Self-serve terminal 320. Since Self-serve terminal 320 may be loaded with printed tickets or have a proprietary printing system, the User Device 340 may differ in this respect, and may be limited to virtual tickets.

Figure 9:
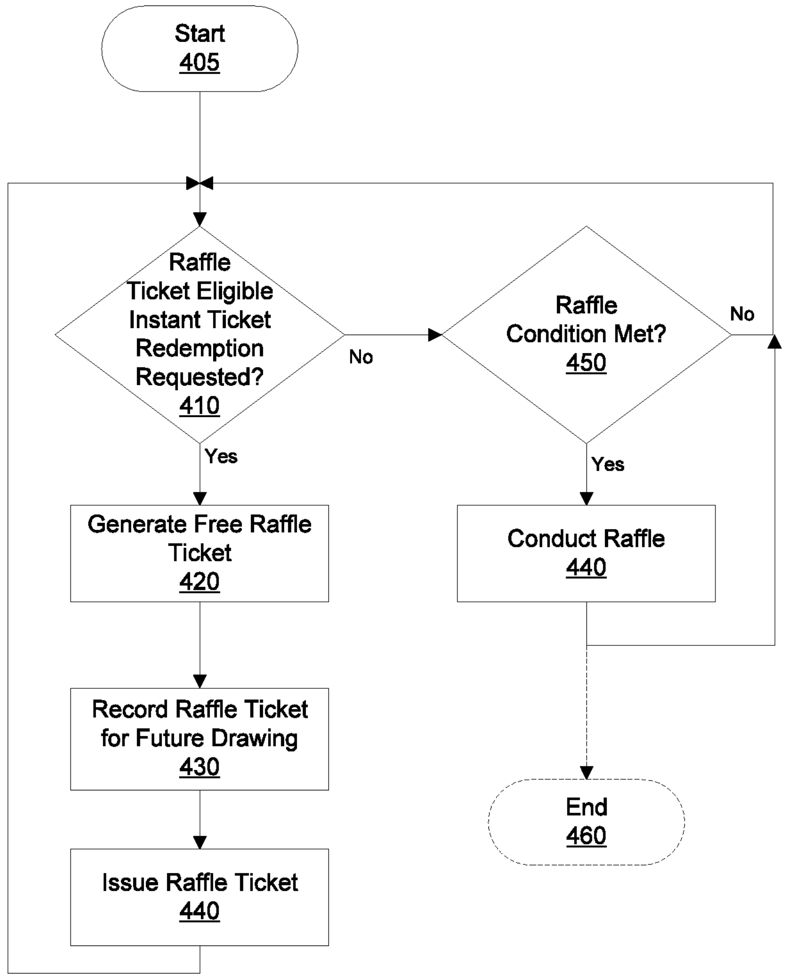
FIG. 9 is a flowchart of an example procedure, according to one example embodiment.

FIG. 9 is a flowchart of an example procedure, according to one example embodiment. FIG. 8 illustrates a repeating procedure of an example embodiment of the host. The Host component may include numerous functions in addition or alternative to what is shown in FIG. 8, and FIG. 8 is an example illustration of the host conducting a raffle on a repeating basis. The procedure may start at 405 and look for a raffle ticket eligible instant ticket redemption request at 410, and if there is a valid request, the host may generate a free raffle ticket at 420. The procedure may then record the raffle ticket for a future drawing at 430. For this example procedure, the host may be coupled with a database, and store a variety of data structures representing raffle ticket entries. It may store customer information, player information, ticket information, generated ticket number, which raffle date it is generated for, or any number of other things. The procedure may then issue a raffle ticket at 440. If no redemption requests 410 come in, the host may check to see if the raffle condition has been met yet 450. As discussed for prior embodiments, the raffle condition may be a date or when a certain number of tickets have been sold or redeemed. There may be many raffles consecutively or concurrently. A lottery game (e.g., a printing of a million tickets) may have a certain number of tickets with raffle eligible indicators, and those tickets may be redeemed for a free raffle ticket. The host may enter all the tickets redeemed during a specific period into a specific raffle, and tickets redeemed after that period may be entered into a subsequent raffle. Alternatively, eligibility for a free raffle ticket may expire at a certain time, or may only be valid for a specific raffle or specific set of raffles. If the raffle condition is met, the procedure may conduct the raffle at 440, which may include selecting one or more raffle winners. The one or more raffle winners may win one or more prizes of equal or varying value. After the raffle 440 or if the raffle condition is not met, the procedure may return to waiting for redemption requests 410 or may again check to see if the raffle condition has been met yet 450. It may be the case that a lottery game (e.g., a printing of a million tickets) will have one raffle or may have more than one raffle. For example, if a lottery has only one raffle, after the raffle 440 has been conducted, the procedure may proceed to an end condition 460. Tickets may be redeemable for any of the raffles, or may be redeemable during the next lottery game (e.g., the next printing of a million tickets).

It will be appreciated that all of the disclosed methods, games, and procedures described herein can be implemented using one or more computer programs or components. These components may be provided as a series of computer instructions on any conventional computer-readable medium, including RAM, ROM, flash memory, magnetic or optical disks, optical memory, or other storage media. The instructions may be configured to be executed by a processor which, when executing the series of computer instructions, performs or facilitates the performance of all or part of the disclosed methods, games, and procedures.

It should be understood that there exist implementations of other variations and modifications of the invention and its various aspects, as may be readily apparent to those of ordinary skill in the art, and that the invention is not limited by specific embodiments described herein. Features and embodiments described above may be combined. It is therefore contemplated to cover any and all modifications, variations, combinations or equivalents that fall within the scope of the basic underlying principals disclosed and claimed herein.

The invention claimed is:

1. A method for facilitating the operation of an instant win lottery game with an associated raffle game, comprising:

providing a plurality of instant win lottery tickets to customers, the tickets including game play information, a first subset of the plurality of tickets having game play information that indicates the tickets are winners of prizes in the instant win lottery game, a second subset of the tickets having game play information that includes a bonus indicator, the bonus indicator indicating the holder of the ticket is eligible for entry in a bonus raffle game, wherein a third subset of the plurality of tickets have game play information that indicates both that the ticket is a winner of a prize in the instant win lottery game and also that the ticket is eligible for entry in a bonus raffle game, and a fourth subset of tickets having game play information that indicates that the ticket is not eligible for an instant win prize or a bonus raffle game entry;

responsive to a customer presenting a ticket from the first or third subset of tickets for redemption, redeeming the presented ticket for a prize in the instant win lottery game;

responsive to a customer presenting one or more tickets from the second or third subset, entering the one or more tickets in the bonus raffle game until a predetermined fraction of the tickets eligible for the raffle game entry have been redeemed for a raffle entry; and after the predetermined fraction of the tickets eligible for a raffle entry in the raffle game have been redeemed, conducting the bonus raffle game.

2. The method of claim 1, wherein the bonus raffle game is a future draw raffle game.

3. The method of claim 1, wherein the prize for the instant win lottery game is a cash prize.

4. The method of claim 1, wherein the tickets of the second and third subset are eligible for entry in the bonus raffle game without the game play information having a predetermined series of numbers to be played in the bonus raffle game.

5. The method of claim 1, wherein the raffle occurs after the redemption of all eligible game tickets.

6. The method of claim 1, wherein the raffle occurs after the closing of the instant win lottery game.

7. A system for facilitating the operation of a game of chance, comprising:

a plurality of pre-printed instant win lottery tickets with removable coverings concealing game play information;

a first subset of the plurality of pre-printed instant win lottery tickets having game play information that indicates the ticket is a winner of a prize, wherein a set is a subset of the plurality;

a second set of the plurality of pre-printed instant win lottery tickets having a bonus raffle eligibility indicator indicating the holder of the instant ticket is eligible for a free entry in a bonus future draw raffle game;

a plurality of terminals configured to receive the tickets in the first set of tickets for redemption redeem the tickets for prizes in the instant win lottery game, the terminals further configured to redeem tickets in the second set of lottery tickets for a free raffle entry in a future draw raffle; and a host in network communication with the terminals, wherein the host is configured to provide redemption information, prize information, and raffle entry information to the terminals, wherein the host further provides the information until a predetermined fraction of the tickets eligible for the raffle game entry have been redeemed for a raffle entry, upon which the host conducts the bonus raffle game, the host further configured to provide information to the terminals enabling the terminals to issue raffle entries to the appropriate instant win lottery ticket holders, the host further configured to conduct the raffle by randomly selecting one or more winning raffle entries from the set of raffle entries.

8. The system of claim 7, wherein the host is further configured to record entries in the raffle game, the recorded entries including at least one of entrant data, sales data, instant win lottery ticket redemption information, generated raffle entry information, raffle entry redemption information, or raffle winner information.

9. The system of claim 7, wherein the tickets of the second set are eligible for entry in the raffle game without the game play information having a predetermined series of numbers to be played in the bonus raffle game.

10. The system of claim 7, wherein the plurality of tickets further comprise a third subset of tickets having the prizes of both the first set of tickets and the raffle eligibility of the second set of tickets.

11. The system of claim 10, wherein the plurality of tickets further comprises a fourth subset of plurality of tickets that are ineligible for an instant win lottery prize and also are ineligible for a raffle entry.

12. A system for facilitating the operation of a game of chance, comprising:

a plurality of tickets with game play information on a first layer of the ticket, the tickets having a second opaque layer removable by a player to reveal an indication of some prize;

game play information indicating an instant prize of known value; and game play information indicating eligibility for a free future draw raffle ticket, the free raffle ticket having an unknown value until the future draw determines if the raffle ticket is a winner, and wherein the game play information does not include a predetermined series of numbers to be played in the future draw raffle.

13. The system of claim 12, wherein the game play information indicating eligibility for a free future draw raffle chance is separate from the game play information indicating an instant prize of a known value.

14. The system of claim 13, wherein the game play information includes a human-readable code indicating the instant win lottery ticket is eligible for redemption for a raffle game chance.

15. A method for facilitating play of a game of chance, comprising:

providing a plurality of instant win lottery tickets for at least one instant ticket game, wherein all of the instant win lottery tickets include game play information for at least one instant ticket game, wherein at least a first subset of the instant lottery tickets have game play information indicating the ticket is a winner of a prize in the instant ticket game, wherein at least a second subset of the instant lottery tickets have at least one symbol indicating the instant ticket is eligible for an entry in a bonus raffle game;

responsive to receiving an instant win lottery ticket from the first subset that has been tendered for a prize, redeeming the lottery ticket for the prize indicated by the game play information on the lottery ticket;

repeating the redeeming for other ticket holders with lottery tickets in the first subset of the instant lottery tickets;

responsive to receiving a lottery ticket from the second subset that has been tendered for the entry in the bonus raffle game, providing the ticket holder presenting the lottery ticket for redemption with a free raffle ticket;

repeating the providing for other ticket holders with lottery tickets in the second subset, yielding a plurality of ticket holders holding a plurality of free raffle tickets;

after the plurality of free raffle tickets has been provided, randomly selecting at least one of a plurality of the free raffle tickets as a winner in a raffle; and responsive to receiving the winning ticket of the raffle for redemption, providing a ticket holder with a raffle prize.

16. The method of claim 15, wherein providing the ticket holder presenting the lottery ticket for redemption with a free raffle ticket further comprises generating the raffle ticket for the player.

17. The method of claim 16, wherein the eligibility indicator may be contained in the game play information.

18. The method of claim 17, wherein a plurality of instant win lottery tickets are of both first and second subsets.

19. The method of claim 18, wherein a record is generated for each free raffle ticket provided.

20. The method of claim 19, wherein the record is stored in a database.

21. The method of claim 20, wherein the randomly selecting may include randomly selecting one of the records and announcing that the ticket corresponding to the selected record is a winner in the raffle.

22. The method of claim 21, further comprising providing a unique human readable identification information on each of the provided raffle tickets; and storing in association with each of the records, the human readable identification information on the corresponding free raffle ticket.

23. The method of claim 22, wherein the free raffle tickets are only provided for those eligible instant lottery tickets that are presented for redemption prior to the raffle drawing, and the winner of the raffle is selected from the raffle tickets that are actually provided to ticket holders.

24. A method for facilitating play of a game of chance, comprising:

providing a plurality of instant win lottery tickets for at least one instant ticket game, wherein all of the instant win lottery tickets include game play information for at least one instant ticket game, wherein at least a subset of the instant lottery tickets have game play information indicating the ticket is a winner of a prize in the instant ticket game;

responsive to receiving an instant win lottery ticket from the first subset that has been tendered for a prize, redeeming the lottery ticket for the prize indicated by the game play information on the lottery ticket;

incrementing a counter with each instant win lottery ticket redeemed;

repeating the redeeming for other ticket holders with lottery tickets in the subset of the instant lottery tickets;

responsive to the counter reaching a determined value, providing the ticket holder redeeming an instant win lottery ticket when the counter reaches the determined value with a bonus prize.

25. The system of claim 24, wherein the bonus prize is the top prize in a prize structure for the game.

26. A method for facilitating play of a game of chance, comprising:

providing a plurality of instant win lottery tickets for at least one instant ticket game, wherein all of the instant win lottery tickets include game play information for at least one instant ticket game, wherein at least a first subset of the instant lottery tickets have game play information indicating the ticket is a winner of a prize in the instant ticket game, wherein at least a second subset of the instant lottery tickets have game play information indicating the ticket is a winner of a prize in the instant ticket game and further comprises at least one symbol indicating the instant ticket is eligible for an entry in a bonus raffle game;

responsive to receiving an instant win lottery ticket from the first subset that has been tendered for a prize, redeeming the lottery ticket for the prize indicated by the game play information on the lottery ticket;

repeating the redeeming for other ticket holders with lottery tickets in the first subset of the instant lottery tickets;

responsive to receiving a lottery ticket from the second subset that has been tendered for the entry in the bonus raffle game, redeeming the lottery ticket for the prize indicated by the game play information on the lottery ticket and entering the redeemed lottery ticket in a bonus raffle game;

repeating the redeeming and entering for other ticket holders with lottery tickets in the second subset of the instant lottery tickets; and after the plurality of redeemed lottery tickets have been entered, randomly selecting at least one of the plurality of redeemed lottery tickets as a winner of a raffle prize in a raffle.

27. A system for facilitating the operation of a game of chance, comprising:

a plurality of tickets associated with the game of chance;

game play information on each ticket, the game play information indicating whether a player of the ticket is a winner or loser, and whether the player has won eligibility to win a separate prize associated with the game and not associated with a drawing available to players who do not play the game of chance associated with the plurality of tickets.

28. The system of claim 27, wherein the second game is accessed by a device in communication with a remote lottery host.

29. The system of claim 28 wherein the device is a self-serve game terminal.

30. The system of claim 28 wherein the device is a non-self-serve retailer terminal.

31. The system of claim 28 wherein the device is a personal user device.

32. The system of claim 28, wherein the host is operable to inform the player of whether the separate prize has been won.

33. The system of claim 32, wherein the host is operable to initiate a prize award to the player in the event the separate prize has been won.

34. A system for facilitating the operation of a game of chance, comprising:

a plurality of tickets associated with the game of chance;

game play information on each ticket, the game play information indicating whether an instant prize of known value has been won, and further indicating whether the ticket is eligible for a drawing to determine if a separate prize has been won wherein the drawing is not available to players who do not play the game of chance associated with the plurality of tickets.

35. The system of claim 34 wherein the drawing occurs automatically upon a raffle condition being met.

36. The system of claim 35 wherein the raffle condition is met on a set date.

37. The system of claim 35 wherein the raffle condition is met upon a predetermined number of the plurality of tickets being sold.

38. The system of claim 34 wherein the drawing allows instant win redemptions.

* * * * *